US010630753B2

(12) United States Patent
Starck et al.

(10) Patent No.: US 10,630,753 B2
(45) Date of Patent: *Apr. 21, 2020

(54) ASYNCHRONOUS APPLICATION DATA ACCESS SYSTEM AND METHOD

(71) Applicant: BE-BOUND INC., Palo Alto, CA (US)

(72) Inventors: Axel Starck, Palo Alto, CA (US); Olivier Rousseau, Palo Alto, CA (US)

(73) Assignee: BE-BOUND INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,149

(22) Filed: Mar. 4, 2019

(65) Prior Publication Data
US 2019/0215357 A1 Jul. 11, 2019

Related U.S. Application Data

(63) Continuation of application No. 14/928,692, filed on Oct. 30, 2015, now Pat. No. 10,225,317.

(60) Provisional application No. 62/072,949, filed on Oct. 30, 2014.

(51) Int. Cl.
H04W 4/14 (2009.01)
H04L 29/08 (2006.01)
H04L 29/06 (2006.01)

(52) U.S. Cl.
CPC .............. H04L 67/02 (2013.01); H04L 69/08 (2013.01); H04W 4/14 (2013.01)

(58) Field of Classification Search
USPC ........................................................ 455/466
See application file for complete search history.

(56) References Cited

U.S. PATENT DOCUMENTS

| 6,321,257 | B1* | 11/2001 | Kotola ..................... H04W 4/14 455/41.1 |
| 7,996,000 | B1* | 8/2011 | Dubinko ................. H04W 4/18 455/414.4 |
| 8,117,285 | B1* | 2/2012 | Katzer .................... H04L 67/02 709/219 |
| 8,200,259 | B2 | 6/2012 | Kupsh |
| 8,929,849 | B1 | 1/2015 | Dudziak |

(Continued)

FOREIGN PATENT DOCUMENTS

| EP | 1091607 | 4/2001 |
| EP | 1531646 | 11/2010 |

OTHER PUBLICATIONS

Risi, Daniel, "MobileDeck: Turning SMS into a Rich User Experience," Proceedings of the 6th International Conference on Mobile Technology Application & Systems, Mobility, (Sep. 9, 2009), pp. 1-4.

Primary Examiner — Charles N Appiah
Assistant Examiner — Frank E Donado
(74) Attorney, Agent, or Firm — DLA Piper LLP (US)

(57) ABSTRACT

An asynchronous application data access system and method are provided. In one implementation, the system and method may be used to provide data connectivity to geographic areas with limited bandwidth or connectivity so that those geographic areas will have access to a range of modern applications that use digital data including for example an email application, such as Gmail, a social networking application, such as Facebook, and LinkedIn and various other applications. In some implementations, an SMS network may be used as one of the variety of transport mechanisms of the system.

17 Claims, 11 Drawing Sheets

(56) References Cited

U.S. PATENT DOCUMENTS

| | | | |
|---|---|---|---|
| 9,503,415 B2* | 11/2016 | Goulart | H04L 51/14 |
| 9,693,206 B2 | 6/2017 | Bishop, Jr. | |
| 2003/0233329 A1 | 12/2003 | Laraki | |
| 2004/0068532 A1 | 4/2004 | Dewing et al. | |
| 2005/0108436 A1 | 5/2005 | Goossen et al. | |
| 2005/0118995 A1* | 6/2005 | Montes | H04M 1/72522 |
| | | | 455/425 |
| 2007/0191032 A1 | 8/2007 | Doffman | |
| 2007/0249379 A1 | 10/2007 | Bantukul | |
| 2008/0032718 A1* | 2/2008 | Suresh | H04W 48/12 |
| | | | 455/466 |
| 2009/0144395 A1 | 6/2009 | DeSalvo | |
| 2009/0235349 A1 | 9/2009 | Lai et al. | |
| 2009/0248883 A1* | 10/2009 | Suryanarayana | G06F 9/451 |
| | | | 709/229 |
| 2010/0223046 A1* | 9/2010 | Bucchieri | G06F 17/2872 |
| | | | 704/3 |
| 2011/0014933 A1* | 1/2011 | Karmarkar | H04M 1/72547 |
| | | | 455/466 |
| 2011/0060813 A1 | 3/2011 | Payne et al. | |
| 2011/0078333 A1 | 3/2011 | Jakubowski | |
| 2011/0208822 A1* | 8/2011 | Rathod | G06F 16/9535 |
| | | | 709/206 |
| 2011/0269437 A1* | 11/2011 | Marusi | G06F 16/9577 |
| | | | 455/414.1 |
| 2012/0208575 A1 | 8/2012 | Wilson | |
| 2012/0260202 A1* | 10/2012 | Jiang | G06F 3/04817 |
| | | | 715/765 |
| 2013/0172028 A1 | 7/2013 | McNamara | |
| 2013/0212005 A1* | 8/2013 | Marincola | G06Q 20/26 |
| | | | 705/39 |
| 2013/0295974 A1* | 11/2013 | Reding | H04M 1/72552 |
| | | | 455/466 |
| 2014/0142963 A1 | 5/2014 | Hill et al. | |
| 2014/0157358 A1* | 6/2014 | Agarwal | H04L 63/0227 |
| | | | 726/1 |
| 2014/0269678 A1* | 9/2014 | McGee | G06F 17/289 |
| | | | 370/352 |
| 2014/0304321 A1 | 10/2014 | Stroila | |
| 2015/0019480 A1* | 1/2015 | Maquaire | G06F 16/252 |
| | | | 707/609 |
| 2015/0095777 A1* | 4/2015 | Lim | H04L 67/02 |
| | | | 715/716 |
| 2015/0127565 A1* | 5/2015 | Chevalier | G06Q 10/00 |
| | | | 705/319 |
| 2015/0139610 A1 | 5/2015 | Syed | |
| 2016/0127491 A1* | 5/2016 | Na | H04L 67/10 |
| | | | 709/217 |

* cited by examiner

```
[c]  => Reims, France        -> City
[0]  => Array
(
    [cft] => Moderate or heavy rain in area with thunder  -> current forecast
                                              -> current forecast (index)
    [cfi] => 105
    [ctf] => 41                               -> current temperature in °F
    [ctc] => 5                                -> current temperature in °C
    [chi] => 87                               -> humidity
    [cht] => Humidity: 87%                    -> humidity with text
    [cwd] => N                                -> direction of wind
    [cwm] => 11                               -> speed of wind in mph
    [cwk] => 17                               -> speed of wind in km/h
    [cwt] => Wind: N at 11 mph                -> speed of wind with text
    [cwd] => 0                                -> direction of wind
)
```

Example of JSON response to a weather request for « Reims » in France

We keep only « critical data » : Reims, France; 105; 41; 87; N; 11; 0

FIGURE 10

| Be Weather IoT | Version 3.2 |
|---|---|
| 100 | Sunny |
| 101 | Partly Cloudy |
| 102 | Cloudy |
| 103 | Overcast |
| 104 | Mist |
| 105 | Moderate or heavy rain in area with thunder |

FIGURE 11

ASYNCHRONOUS APPLICATION DATA ACCESS SYSTEM AND METHOD

PRIORITY CLAIM/RELATED APPLICATIONS

This application claims priority under 35 USC 120 and is a continuation of U.S. patent application Ser. No. 14/928,692, filed Oct. 30, 2015 and entitled "ASYNCHRONOUS APPLICATION DATA ACCESS SYSTEM AND METHOD" (issued as U.S. Pat. No. 10,225,317 on Mar. 5, 2019) that in turn claims the benefit under 35 USC 119(e) and priority under 35 USC 120 to U.S. Provisional Patent Application Ser. No. 62/072,949 filed on Oct. 30, 2014 and entitled "Asynchronous Application Data Access System And Method", the entirety of all of which are incorporated herein by reference.

FIELD

The disclosure relates generally to a system and method for digital data access using different networks and protocols.

BACKGROUND

Current wireless 3G and 4G systems provide a good level of data connectivity to wireless devices, and, typically, in first-world countries, have a large amount of backhaul capacity, connecting access points to the larger Internet. Over this infrastructure, applications running on mobile devices typically access a variety of application programming interfaces (APIs) that are provided using known HTTP REST endpoints. In addition, specialized applications using such REST endpoints provide access to a variety of services, including services such as email or social services such as Facebook.

However, in developing countries, backhaul systems are frequently congested, have limited bandwidth, and are many hops away from servers on the western Internet. Worse, the direct connection to the mobile device is made using older 2G technology, which offers limited data networking capabilities. Furthermore, even in first-world countries, there may be particular geographic areas in which the same issues of limited bandwidth or limited data networking capabilities exist. Thus, it is desirable to provide these areas with Internet connectivity and access to a range of modern applications, such as email applications like Gmail and social networking applications, such as Facebook, and Twitter.

Furthermore, even if a first-world country has good bandwidth or good data networking capabilities, a user may be on a limited data plan in which the user can only download a certain amount of digital data during a particular time period, such as a month. It would be desirable to provide a way in which the user could download the digital data and access the applications without always using the allotted data of the limited data plan.

In addition, wireless network operators are continually facing challenges to provide the level and quantity of data access for some first-world countries. In particular, they either cannot build out their network infrastructure quickly enough to keep up with the user demand for data or do not want to expend the resources to build out their network infrastructure. It would be desirable to provide a way in which the network operator can provide the digital data access and access to the applications using other data networking resources.

BRIEF DESCRIPTION OF THE DRAWINGS

FIG. 10 illustrates an example of a JSON response to a request for weather data request by the weather sub-application;

FIG. 11 illustrates an example of a look-up table that may reduce the number of bytes communicated between the backend component and the computing device.

DETAILED DESCRIPTION OF ONE OR MORE EMBODIMENTS

The disclosure is particularly applicable to a system and method for providing data connectivity to geographic areas with limited bandwidth or connectivity using a 2G network or a short message system (SMS) network (either being a secondary network) and it is in this context that the disclosure will be described. It will be appreciated, however, that the system and method has greater utility, such as to using other communication protocols and/or other data networks to provide data connectivity to geographic areas with limited bandwidth or connectivity. Furthermore, the system and method may be used to provide a way in which the user could download the digital data and access the applications without always using the allotted data of the limited data plan or used to allow a network operator to provide digital data access and access to the applications using other data networking resources.

The advantage of providing data connectivity to geographic areas with limited bandwidth or connectivity is that those geographic areas will have access to a range of modern applications that use digital data including for example an email application, such as Gmail, a social networking application, such as Facebook, and or a RSS reader and various other applications. To address this need, a system and method are provided for providing asynchronous access to the Internet across a variety of transport mechanisms, including SMS in one exemplary embodiment of the system.

Figure 1:
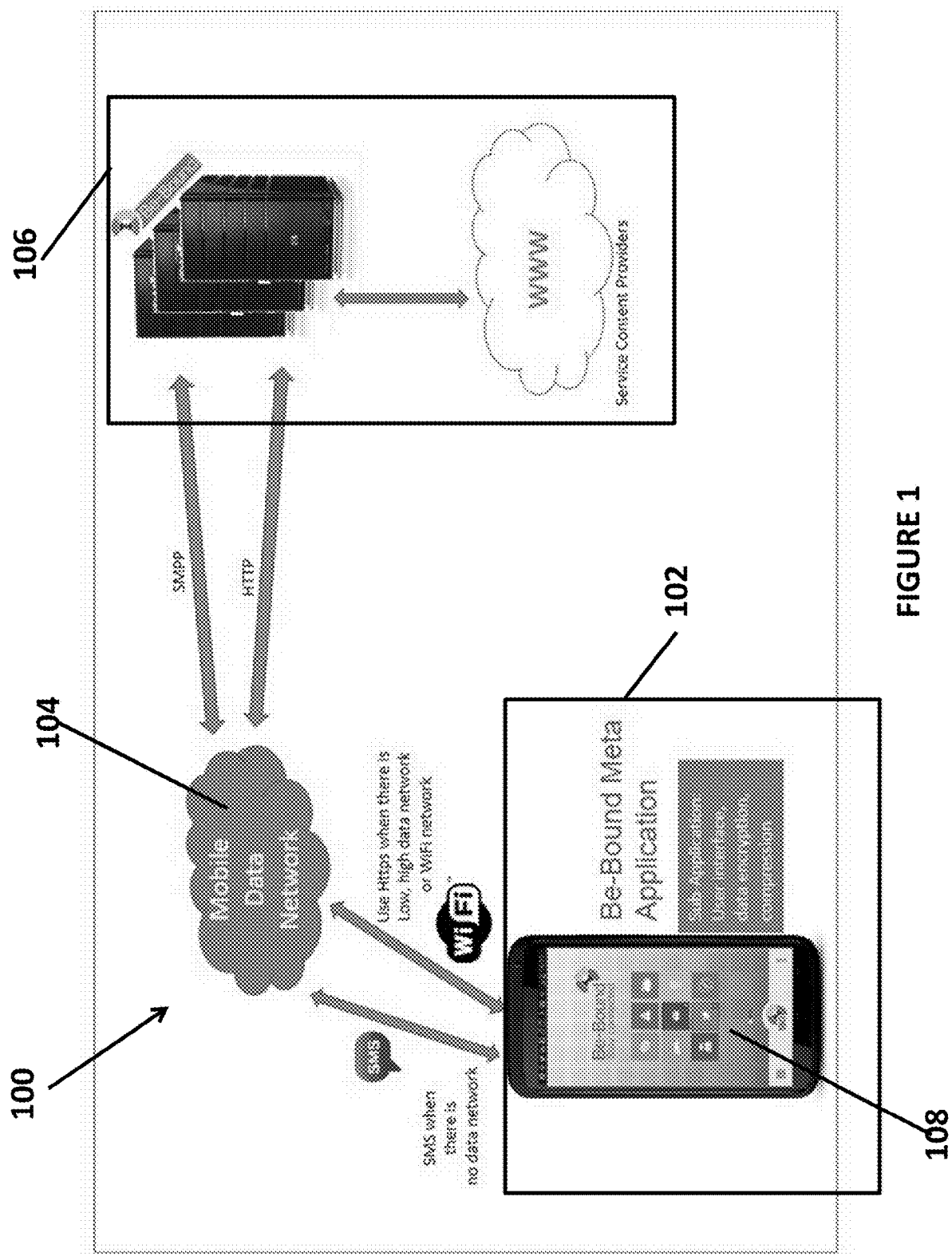
FIG. 1 illustrates an example of an implementation of a system for asynchronous application data access.

FIG. 1 shows an example of an implementation of a system 100 for asynchronous application data access that uses a client server type computer system architecture. The system 100, however, also may be implemented using other architectures or models that are within the scope of the disclosure. For example, the system 100 may be implemented using a cloud computing architecture, a software as a service model as well as other models and architectures.

The system 100 may have one or more computing devices 102, such as the smartphone device example shown in FIG. 1 and a backend component 106 that may be known as a receiver. Each computing device may couple to and access/interact with the backend component 106 over a communications path 104 that allows each computing device to gain data access to application data over a variety of communication paths 104 using the backend component 106 as described below. Each computing device 102 may be a processor based device that has at least one processor, memory such as DRAM, persistent storage, such as flash memory or a hard disk drive, a display, an input device such as a keyboard, a touchscreen, a mouse, etc. and one or more circuits that allow the computing device to couple to a variety of different communication paths. For example, each computing device 102 may be a smartphone device, such as an Android® operating system based device, a personal computer, a tablet computer or a laptop computer. Furthermore, each computing device 102 may be any other device in which it is desirable to be able to gain data access to application data over a variety of communication paths 104 using the backend component 106 as described below.

Figure 2:
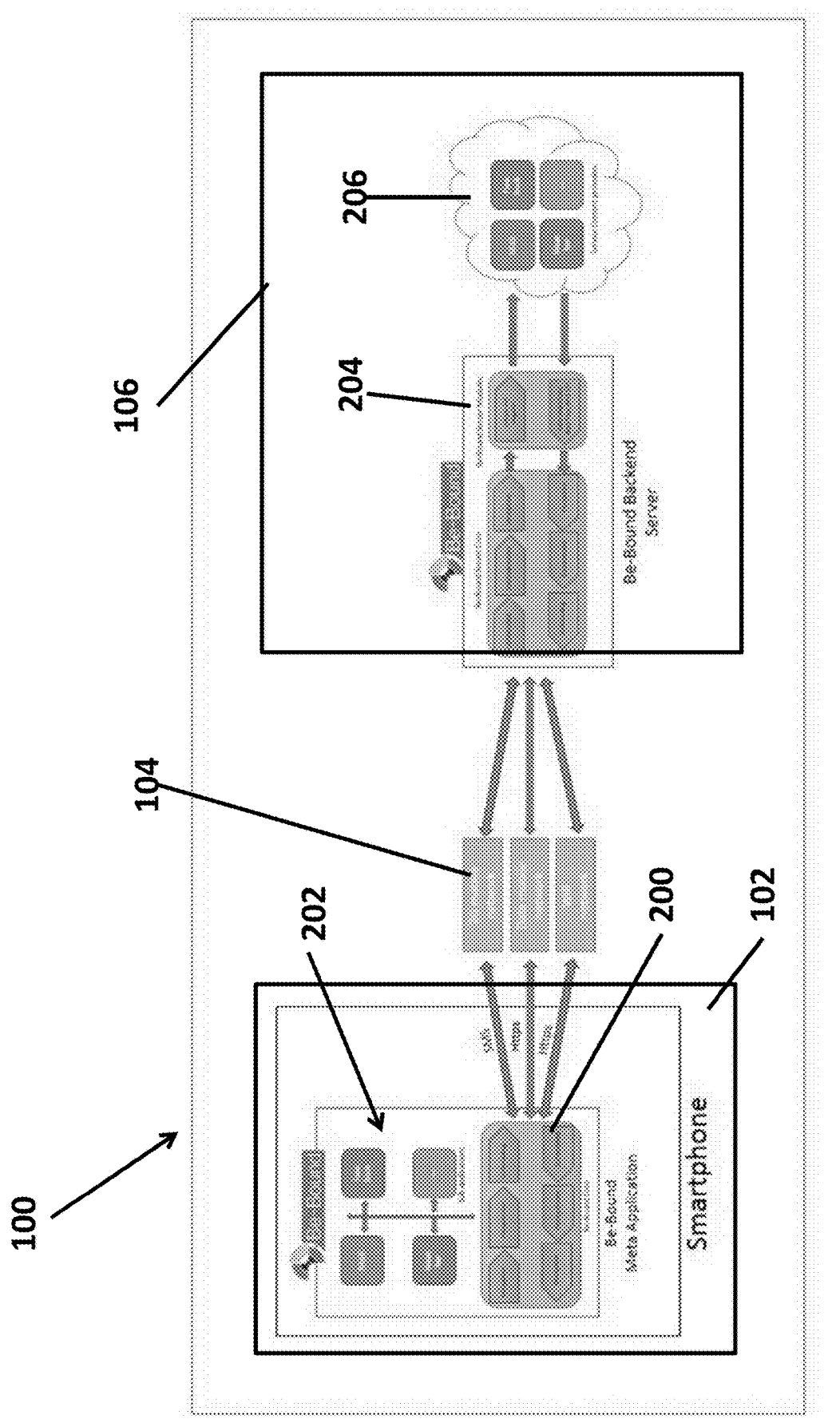
FIG. 2 illustrates more details of the system for asynchronous application data access.
Figure 4:
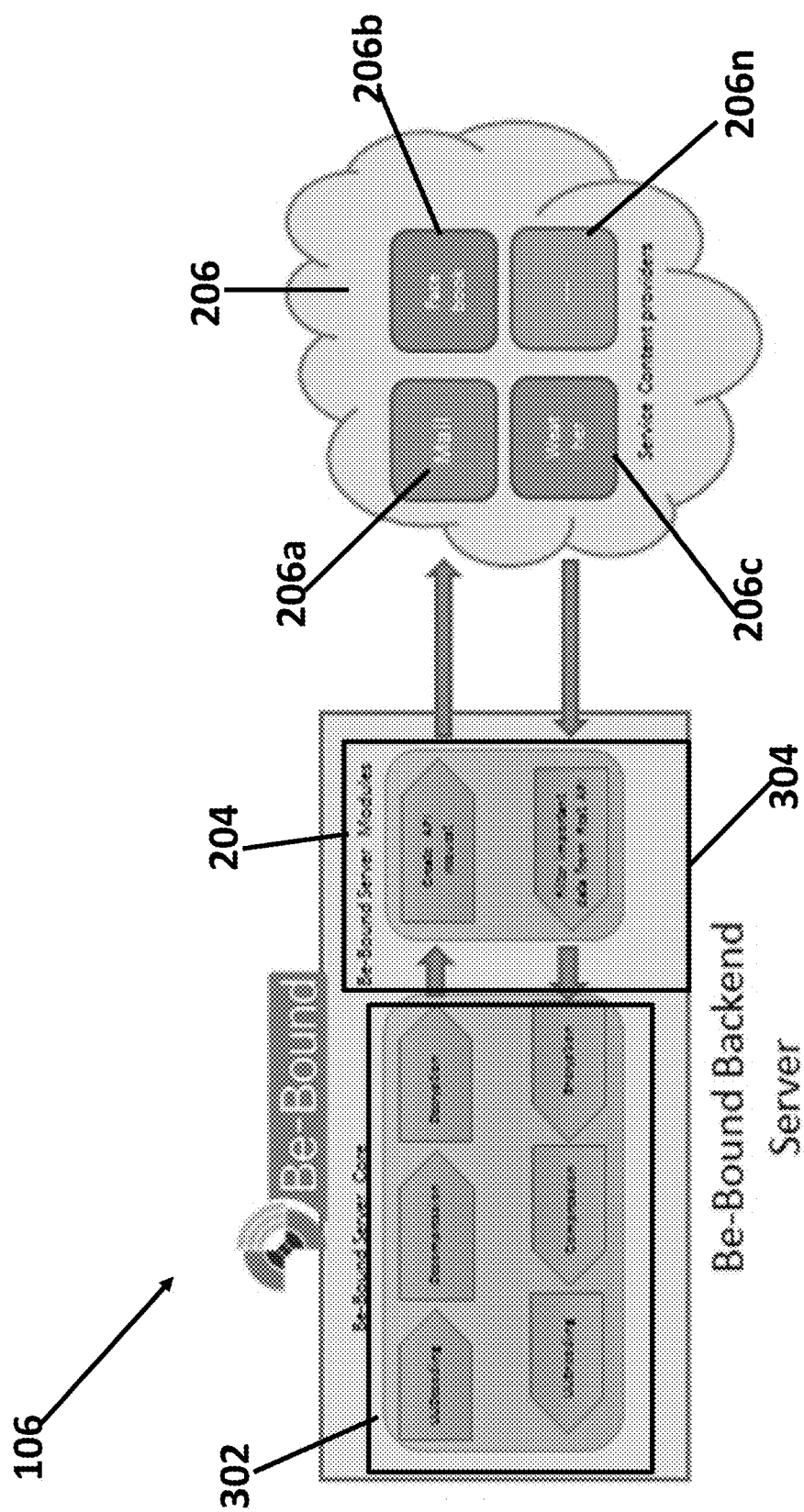
FIG. 4 illustrates more details of the backend component of the system for asynchronous application data access.

Each computing device 102 may have a Be-Bound component 108 that interacts with the backend component 106 over the variety of communication paths 104. The Be-Bound component 108 may be implemented in software (as shown in FIGS. 1-2 and 4) or hardware. When the Be-Bound component 108 is implemented in software, the component 108 may be a plurality of lines of computer code as described below in more detail. When the Be-Bound component 108 is implemented in hardware, the component 108 may be a separate hardware device that couples to the computing device, such as a memory stick, a dongle, etc. to implement the data access over the variety of communication paths 104 or it may be a circuit/device that is part of the computing device 102, such as an application specific integrated circuit, an integrated circuit, a programmed logic device, a microcontroller and the like.

In a software implementation, each computing device 102 may have a Be-Bound application 108 that is the plurality of lines of computer code that may be executed by the processor of the computing device. The Be-Bound application 108 may be stored in the persistent storage or memory of the computing device or it may be downloaded onto the computing device from a remote source. In general, the Be-Bound application 108 may include a plurality of sub-applications with specific functionality and the system is used to access data for those sub-applications. Each sub-application may be any application that requires data access to provide its full functionality. For example, each sub-application may be an email application, an information application such as news application or weather application, a social networking application or a game application. In some embodiments of the system, the Be-Bound application 108 may be used with applications already resident on the computing device or capable of being downloaded to the computing device. Those applications, that may include third party applications, may then use an interface to interact with the core components of the Be-Bound application.

The backend component 106 may be one or more computing resources that host and house the functional components of the backend component as described below. The one or more computing resources may be one or more server computers (as shown in the example in FIGS. 1-4) or one or more cloud computing resources. The one or more computing resources may include one or more processors, memory, persistent storage and communications circuits that host or store or execute the components that make up the backend component 106. The backend component 106 and the components of the backend component 106 may be implemented in software (as shown in FIGS. 1-2 and 4) or hardware. When the backend component 106 and the components of the backend component 106 are implemented in software, each component may be a plurality of lines of computer code resident in the one or more computing resources and executed by at least one processor of the one or more computing resources. When the components are implemented in hardware, each component may be a separate hardware device such as a memory stick, a dongle, an application specific integrated circuit, an integrated circuit, a programmed logic device, a microcontroller and the like. The backend component 106 may also include one or more service content providers that provide the content data that is subsequently sent to each computing device 102. The one or more service content providers may be part of the system 100 or may be third party systems that may be accessed using APIs.

The communications path 104 between each computing device and the backend component 106 may use a variety of communication protocols and data protocols. For example, the communications path 104 may include a 2G network, a WiFi network, a short messaging system (SMS) network or other non-data networks, a 3G data network, a 4G data network, other higher speed data networks and the like. When the communications path 104 is not a data network, the SMS network (or other non-data networks) may be used in this embodiment. As shown in FIG. 1, when a data network is being used, the computing device 102 and the backend component 106 may communicate with each other using the known HTTP or HTTPS protocol. Alternatively, as shown in FIG. 1, when the SMS network is being used, the computing device 102 and the backend component 106 may communicate with each other using the known Short Message Peer-to-Peer (SMPP) protocol or a short message service center (SMSC) protocol. It is important to note that each computing device 102, when it couples to and interacts with the backend component 106 may use a different communications path 104. For example, computing device A may have 3G data network access and thus use that data network while computing device B may only have SMS access and thus use the SMS network.

In the software implementation of the system, the Be-Bound application 108 communicates to the backend component 106 using SMS or HTTP, dependent on the type of connection available to each particular computing device. HTTP is used in the case where a high or low bandwidth data connection is available. When there is only an SMS system available, however, SMS may be used and the SMS data may be split and compressed into multiple textual SMS messages which keeping the length as short as possible. The backend component 106 may communicate over HTTPS to a variety of HTTP REST endpoints provided by external service/content providers.

Figure 3:
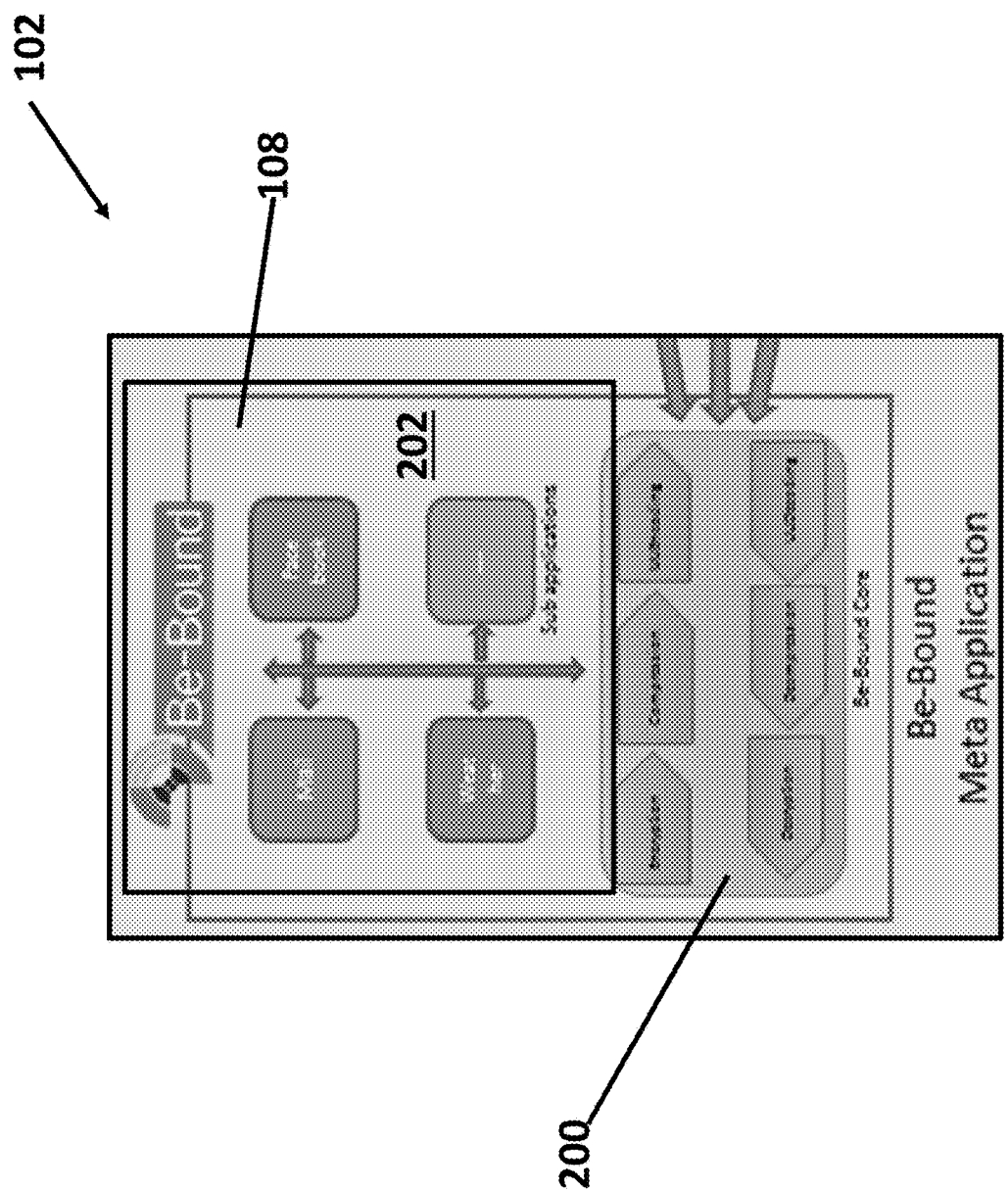
FIG. 3 illustrates more details of each computing device of the system for asynchronous application data access.

Now, further details of the system are described with reference to FIGS. 2-4 that show more details of the system 100. As shown in FIG. 2 and in more detail in FIG. 3, each computing device 102 may have the Be-Bound component 108 that is hosted on, provided to or executed on the computing device 102. The Be-Bound component 108 may have a core portion 200 and an application container 202. Thus, the system utilizes a meta-application paradigm in which the application container 202 resident on the computing device 102 contains a number of sub-applications. The sub-applications may be developed and connected to the Be-Bound system or may be third party applications. In one implementation, the sub-applications provide functionality such as email, Facebook or weather information. The system, however, is not limited to the particular set of applications shown in the figures as the system may be used for any application that requires data access to provide full functionality to the user. Each sub-application may have its own user interface with which the user can interact.

The access to the data for each sub-application may be provided by a number of application programming interfaces (API's) ("Stubs") typically one per service, although a service can utilize multiple API's if it needs. Each service may be, for example, a weather service that provides weather data, an email service that provides email data and the like. The stubs may be constructed in a semi-automatic fashion from an IDL-like interface description language. This language describes the input and output format for a particular external server exposing a REST API or from a set of components resident in the backend component 106 (internal components). Based on the compilation of this language for each service, a server stub (resident on the backend component 106) and a corresponding client stub (resident on each computing device 102) may be constructed that allow a particular sub-application on the computing device 102 to receive data from a particular content service provider. This pattern is typical to the construction of conventional RPC service classes using IDL, but has one notable difference. In the conventional RPC case, the IDL defines the interface between the client and server stubs, and the data flowing across the connection. In the system 100, the IDL describes a previously build REST API together with restrictions and contractions of data flowing in and out of it, and the client and server stubs are constructed automatically from the description. The system thus semi-automatically generates a remote interface to the web service, with the appropriate proxying code. However, unlike a true proxy, the system 100 deals with the problem of selectively transporting elements of the data from the API across a low bandwidth link whereas a true proxy would simply resend all the data from the end point.

When the user requests data for one of the sub-applications, e.g.: 'Weather for Paris', a request is made to the appropriate API stub. The IDL generated API call passes the call to the application core 200, which selects an available transport layer (using an available communication path) to communicate with the backend component 106 and composes the appropriate message to transport to the remote endpoint. The message includes an API identifier, which is used by the backend component 106 to route the message to the appropriate server side stub, as well as parameters for the message to pass through to the REST API invocation.

The Transport layer uses data transmission via HTTPS or SMS to communicate with the backend component 106. For HTTPS, the communications path may be a Data mobile network or via Wi-Fi network, while SMS (or another non-data network) may be selected when no data connection is available. If SMS is used, then the SMS messages may be encrypted, compressed and uuencoded as shown in FIG. 3.

FIGS. 2 and 4 illustrate more details of the backend component 106 of the system. The backend component 106 may have a data access component 204 and one or more service content providers 206 that provide the content that is communicated to each computing device. For example, as shown in FIG. 4, the one or more service content providers 206 may include an email service content provider 206a, such as Gmail, Yahoo mail, Exchange server and the like, a social network service content provider 206a, such as Facebook, a weather service content provider 206c and other service content providers 206n. Each service content provider may be a third party system that provides an API or it may be a service content system that is part of the backend component 106.

The data access component 204 may further comprise a core component 302 and one or more modules 304. In operation, on the backend component 106, the request message for data from each computing device may be analyzed by the core component 302. If the message is received via SMS, the message may be uudecoded, uncompressed and decrypted by the core component 302. Based on the sub-application identifier embedded in the message (as described above) a corresponding server module 304 may be invoked (e.g.: the Weather module), or an external REST API may be called.

The sub-application on the computing device, the server modules 304, and potential external REST API's provide together a service. Each service uses an encoding that is specific for this service, and is designed to use minimal bandwidth.

Typically, the modules 304 may fetch the requested data from a related content service provider 206. Depending on the service, the data may be filtered so that only the most important parts remain thus reducing the bandwidth. The system can perform this service in two ways, automatically, for simple cases, as specified by the ISL definition, or manually, in which case the module performs the filtering/culling. The filtered data, the result, may be encoded according to the transport layer used in the request, and transmitted to the meta-application core 302. The core 302 handles the decoding and sends the result to the sub-application 202 on the computing device 102 for display.

The backend component 106 may also perform caching and partial response. Specifically, the backend component 106 may cache data received from an external content service provider. This information can later be delivered to the sub-application 202 on subsequent calls. For example, a call to the mailbox of a user may return the email header information of the user's mailbox. When SMS as a transport is used, not all the information is sent back in the response to save bandwidth. In such a case, the information is cached on the server and in the response it is indicated to the client that more data is available, leaving it to the user to ask for more data. The backend component 106 may also have a pre-populated cache of data objects corresponding to invocations to the API with specific parameters so that the above partial response process may be used.

The system described above allows people with no data access or very limited data access on their computing devices 102, such as in certain geographic regions, to use well known popular Internet services. In addition, the system may also be used by a user to reduce his data network usage by routing some of the requests over the SMS network or other non-data network. This may be particularly advantageous for a user who has a limited data access plan. Furthermore, the system may be used by a network carrier to reduce the data bandwidth issues on their network by again routing some of the requests over the SMS network or other non-data network. In both of the latter cases, the user may have data network access, but chooses to re-route some of the requests and data that would otherwise travel over the data network. In each case, the system provides a variety of different communication paths over which the data may be accessed.

The system thus has a meta-application, which is a single application containing multiple sub-applications, each of which has a specific function. For example, one sub-application might represent data from Facebook to the user, while another sub-application might access weather and another sub-application may access email information. To the user, applications are accessed via an "application container" application.

The system is a communications service that provides remote data access to the sub-applications when data access is not otherwise available or being used. The system also is a system and method for encoding API calls made to the communications service into compact messages suitable for transmission across a low-bandwidth link. The APIs and message formats may be generated using a service descriptor, expressed in an IDL like language, which represents the API of an internal server module, or an external REST API server. The system may also compress, encrypt and encode the messages according to the data needed by the API calls expressed using the IDL language.

The system is also a transmission system that selects a transmission media, for example TCP, HTTP, or SMS based on an examination the device's available transport layer system. A backend component may receive a message from the client system via the transmission media. The backend component may have a decoder that decodes, decompresses and decrypts the messages into API calls on a remote system, the remote system having a plurality of API's representing different services or a plurality of systems having separate API's. The remote system may have a set of supporting services accessible via the API calls that perform specific functions, and return data.

The backend component may include a system for selectively processing and culling data from the API calls, encoding these pieces of data as a message or series of messages a similar for to the outgoing messages, based on information provided by an IDL language. The backend component may then send and deliver the message(s) to each computing device. Each computing device may have a system for decoding and mapping the message data to API calls on the computing device.

Figure 12:
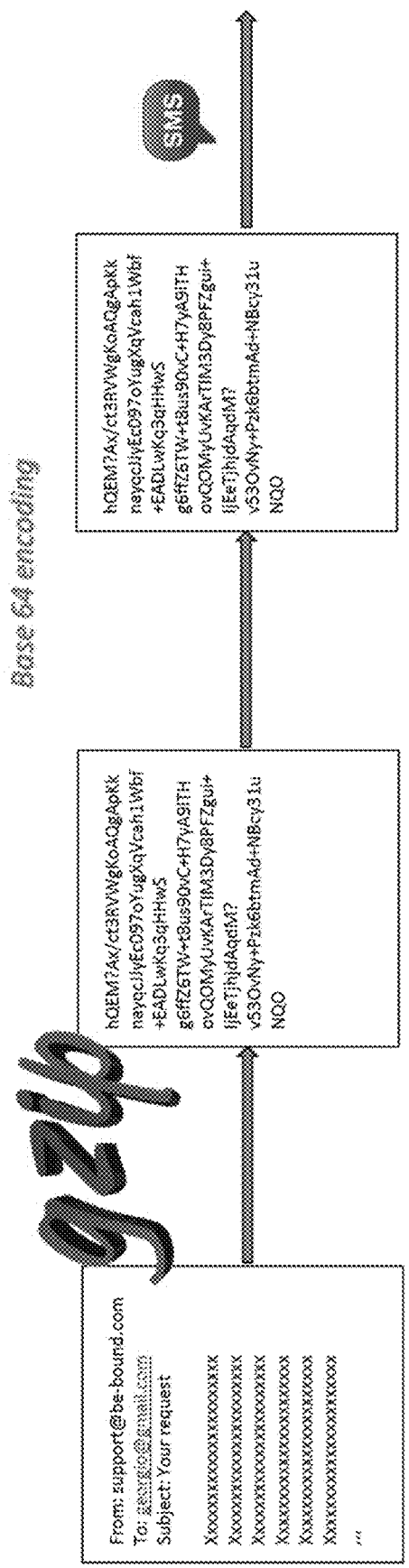
FIG. 12 illustrates an example of the compression and unencoding of an SMS message in the system.

The system may encode the message(s) into uuencoded base64 messages. An example of such a message is shown in FIG. 12. The message(s) may be sent using the SMS protocol. The APIs on the backend component may be HTTP REST APIs. The system may have a pre-populated cache of data objects corresponding to invocations to the API with specific parameters. The data objects may be commonly used web format objects, such as PNG or JPG images. The backend component may have a purchasing component in which each transmitted messages has a "credit cost" which is debited from an account of the user on the backend component maintained balance of credits, credits being purchased by the user as needed.

Figure 5:
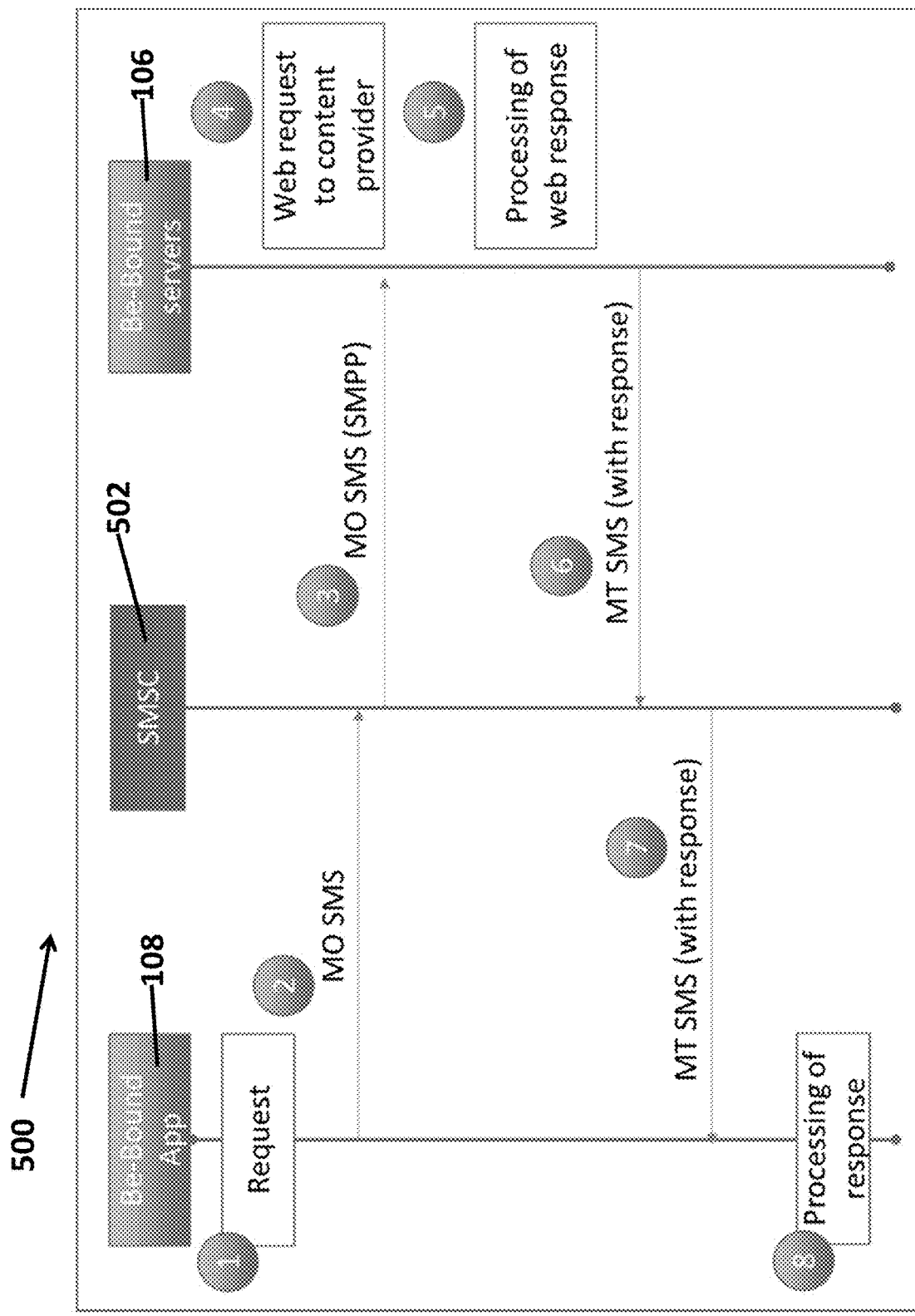
FIG. 5 illustrates a method for asynchronous application data access.
Figure 8B:
FIGS. 8A and 8B illustrate an example of a weather sub-application data access using the asynchronous application data access.
Figure 8A:
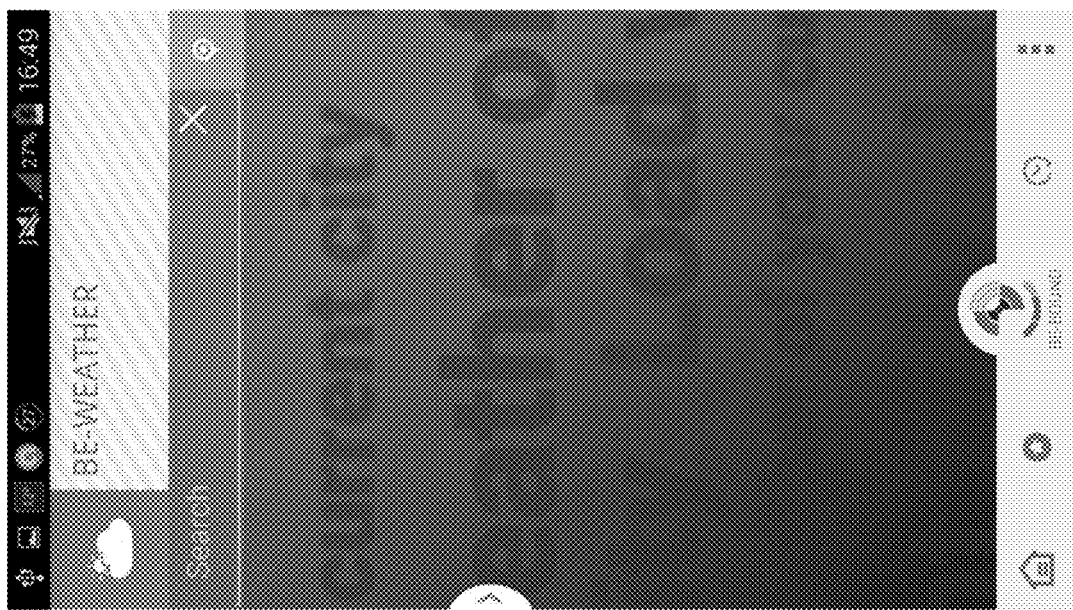
Figure 9:
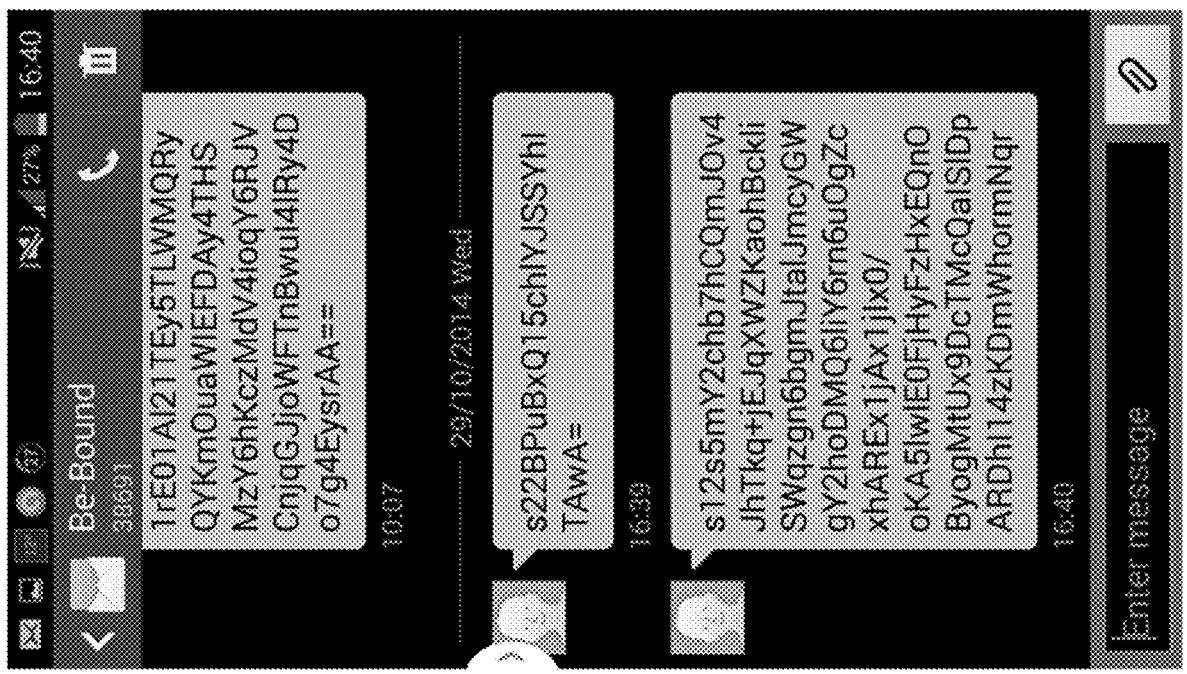
FIG. 9 illustrates an example of the SMS received on the computing device for the weather sub-application.

FIG. 5 illustrates a method 500 for asynchronous application data access using the Be-Bound application 108 resident on a computing device, the backend component 108 and, when exchanging SMS messages, a short message service center (SMSC) 502. The method may involve a request for data access 1 so that an SMS message (MO SMS) is communicated from the computing device to the SMSC 502 that contains the data access request. An example of request may be a request for weather data, examples of which are shown in FIGS. 7-10. The SMSC may then send an SMS message (using SMPP protocol) to the backend components 106. The backend components 106 may then sent a web request to the relevant content provider for the particular data access request, such as a weather service for a weather data request or a mail system for an email data access request. The request is processed and a web response is generated (an example of which is shown in FIG. 10). The processing of the web response may include filtering, etc. (as shown in FIG. 10) and/or a look up table (as shown in FIG. 11 in which the look up table allows a number to be sent for a weather sub-application instead of the textual weather descriptions that would require more bits) to reduce the data to be sent back to the computing device that made the data access request. Then, an SMS message (MT SMS) is sent back to the SMSC with the response and the SMS message with the response is passed back to the computing device. An example of that SMS message is shown in FIG. 9.

Figure 7:
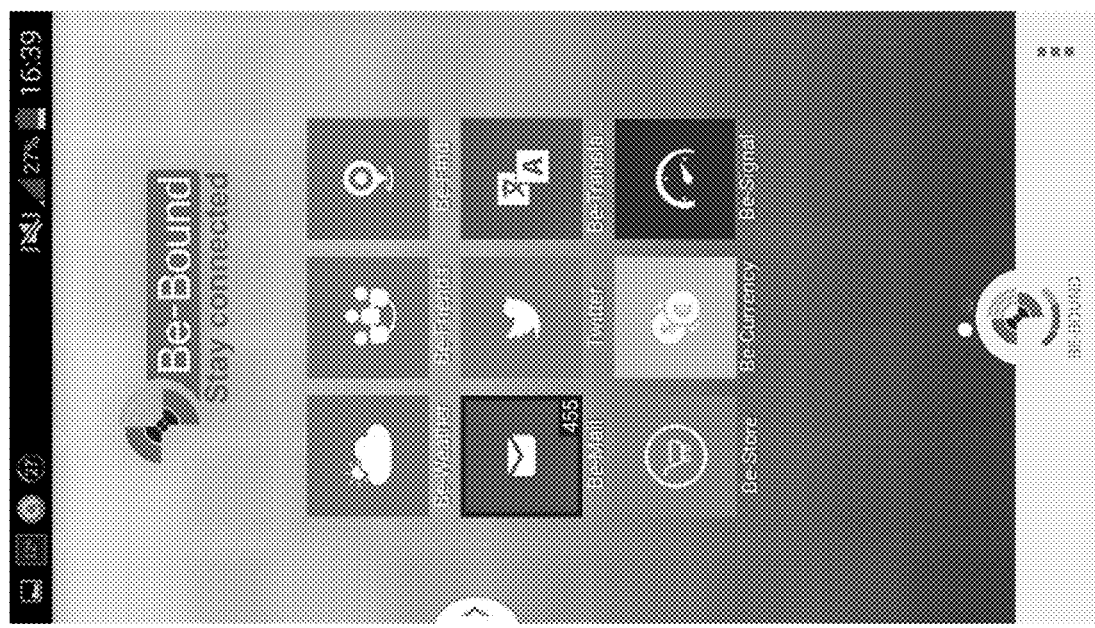
FIG. 7 illustrates an example of a home screen for a computing device having asynchronous application data access.
Figure 6:
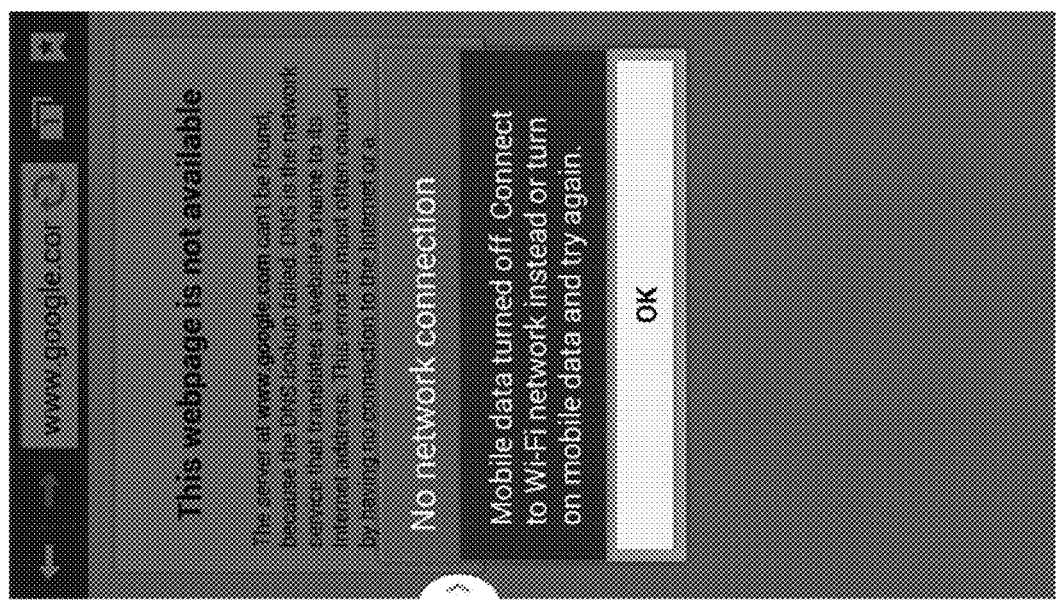
FIG. 6 illustrates a screen of a typical computing device.

FIG. 6 illustrates a screen of a typical computing device when that computing device does not have digital data access. As shown, the application, such as a browser, that requires data access is unable to operate. However, as shown in FIG. 7, even when no digital data access is available, the user is able to use the sub-applications to access data over the non-digital data access network as described above. FIGS. 8A and 8B illustrate an example of a weather sub-application data access using the asynchronous application data access. In particular, FIG. 8A shows a user interface of a weather sub-application when the data access request is being made while FIG. 8B shows the user interface after the weather sub-application has received the data.

For the request and data being communicated over the SMS network, the system may encrypt the messages using both Elliptic Curve Cryptograhy (ECC) and symmetric cryptography (AES). These standards encryption algorithms are customized to the constraints of using only 140 bytes in SMS and to avoid adding too much overhead. For the encryption, when the user registers for the first time to the application, ECC is used to define symmetric keys between the application and the backend component 106. The tradeoff between security and extra payload results in the use of 256 bit keys. Then, these keys are used for AES communications between the application and the backend component 106. To increase security but avoid adding too much overhead, keys are renewed each time an internet connection is available. A ratchet algorithm may be used to renew keys and will be integrated and adjusted with the sequence numbering of the BE-BOUND SMS format.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:
1. A system, comprising:
a source of digital content;
a receiver coupled to the source of digital content over a digital data network and included in a backend component; and
a computing device having display and a processor that executes a client application that is coupled to the receiver over a secondary network comprising a 2G network, the receiver receiving a request for digital content in a message over the secondary network from the client application of the computing device, wherein the digital content corresponds to a particular sub-application operating on the computing device and wherein the request includes an application programming interface (API) call communicated to the receiver with an API identifier used by the receiver to route the message to a digital content source that provides the digital content corresponding to the particular sub- application, the receiver generating the request for digital content corresponding to the particular sub-application from the digital content source via the API call by translating the request for the digital content received over the 2G network into a language that describes a format that allows the particular sub-application on the computing device to receive data from a particular content service provider and converting the requested digital content from the digital content source into a response transmitted over the 2G network to the computing device wherein the receiver, upon making the determination that the computing device is determined to be using the 2G network, splits and compresses the requested digital content into a plurality of short message service (SMS) messages communicated over the secondary network, and the computing device receiving the plurality of SMS messages communicated over the secondary network and converting the plurality of messages into the digital content corresponding to the particular sub-application that is displayed to the user on the display of the computing device.

2. The system of claim 1, wherein the application further comprises a meta-application having a plurality of the sub-applications.

3. The system of claim 1, wherein the receiver further comprises an encoder component that encodes an application programming interface (API) call into a message compatible with the secondary network.

4. The system of claim 3, wherein the message is encoded into an uuencoded base64 message.

5. The system of claim 1, wherein the receiver compresses and encrypts each message communicated over the secondary network to the computing device.

6. The system of claim 1, wherein the receiver further comprises a decoder that decodes, decompresses and decrypts the message from the computing device into a call to the digital content source for the digital content.

7. The system of claim 6, wherein the call to the digital content source is an HTTP REST API call.

8. A computing device, comprising:
a display and a processor that executes a client application, the client application generating a request for digital content in a message and sending the message over a secondary network to a backend component, wherein the digital component corresponds to a particular sub-application operating on the computing device, the secondary network comprising a 2G network, wherein generating the request includes generating an application programming interface (API) call communicated to the backend component with an API identifier used by the backend component to route the message to a digital content source that provides the digital content corresponding to the particular sub-application, the request for the digital content received by the backend component, wherein the backend component translates the request for the digital content received over the 2G network into a language that describes a format that allows the particular sub-application on the computing device to receive data from a particular content service provider and converts the requested digital content from the digital content source into a response transmitted over the 2G network to the computing device, the client application receiving a plurality of short message service (SMS) messages communicated over the secondary network, wherein the backend component receives the digital content corresponding to the particular sub-application from the digital content source via the API call and, upon making the determination that the computing device is determined to be using the 2G network, splits and compresses the requested digital content into the plurality of SMS messages, wherein the client application converts the plurality of messages into digital content and displays the digital content corresponding to the particular sub-application to the user on the display of the computing device.

9. The client of claim 8 wherein the client application decodes and maps the message to one or more application programming interface (API) calls.

10. The client of claim 9, wherein the message is encoded into an uuencoded base64 message.

11. The client of claim 10, wherein each message has a credit cost that is debited from a credit balance.

12. A method for data exchange using a backend system and a computing device capable of communicating over a secondary network, the method comprising:
generating, by a computing device, a request for digital content message in a message, wherein the digital content corresponds to a particular sub-application operating on the computing device;
transmitting the request for data message over a secondary network to a backend system, the secondary network comprising a 2G network, wherein the request includes an application programming interface (API) call communicated to the backend system with an API identifier used by the backend system to route the message to a digital content source that provides the digital content corresponding to the particular sub-application;
generating, at the backend system, a request for the digital content from a remote source by translating the request for the digital content received over the 2G network into a language that describes a format that allows the particular sub-application on the computing device to receive data from a particular content service provider;
receiving, by the backend system, the requested digital content corresponding to the particular sub-application from the remote source via the API call over a different network than the secondary network;
converting, by the backend system, the requested digital content into a plurality of short message service (SMS) messages sent over the 2G network back to the computing device, wherein the converting further comprises, upon making the determination that the computing device is determined to be using the 2G network, splitting and compressing the requested digital content into the plurality of SMS messages;
receiving, by the computing device, the plurality messages over the secondary network and converting the plurality of messages into the digital content corresponding to the particular sub-application; and
displaying, on a display of the computing device and using application executed by a processor of the computing device, the digital content corresponding to the particular sub-application.

13. The method of claim 12, wherein converting the requested digital content into the plurality of messages sent over the secondary network further comprises encoding an application programming interface (API) call into the plurality of messages compatible with the secondary network.

14. The method of claim 13, wherein the message is encoded into an uuencoded base64 message.

15. The method of claim 14, wherein encoding further comprises compressing and encrypting the message by the backend system.

16. The method of claim 12, wherein generating the request for digital content further comprises decoding, decompressing and decrypting the message from the computing device into a call to the remote server for the digital content.

17. The method of claim 16, wherein the call to the remote server is an HTTP REST API call.

* * * * *